May 29, 1962     E. C. TRUITT     3,036,649
TRACTION DEVICE
Filed April 22, 1960     2 Sheets-Sheet 1
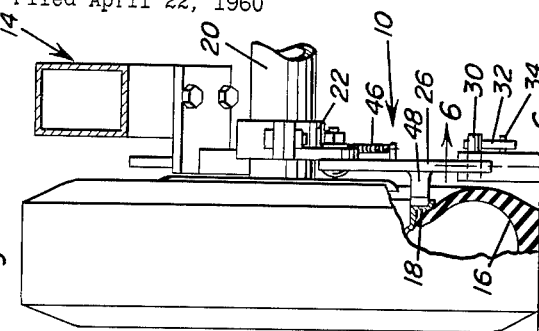
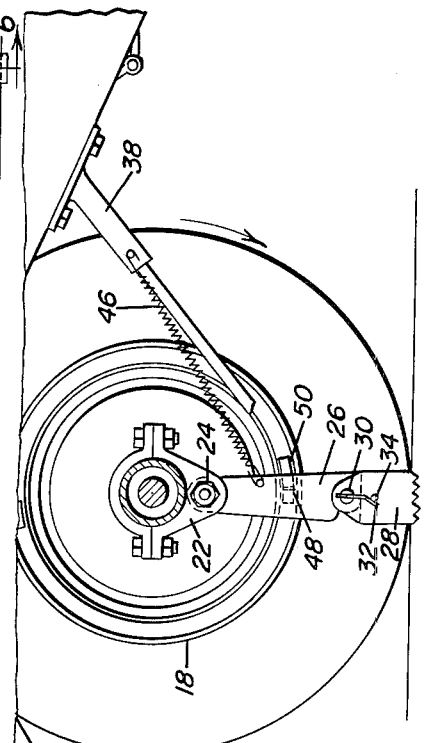
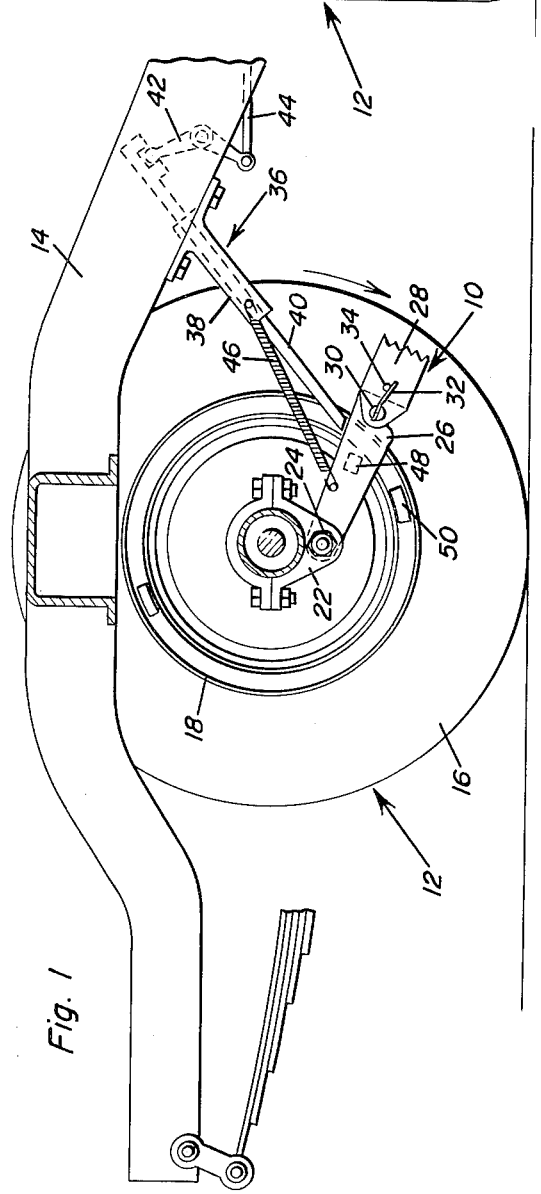
Ernest C. Truitt
INVENTOR.

May 29, 1962
E. C. TRUITT
3,036,649
TRACTION DEVICE
Filed April 22, 1960
2 Sheets-Sheet 2
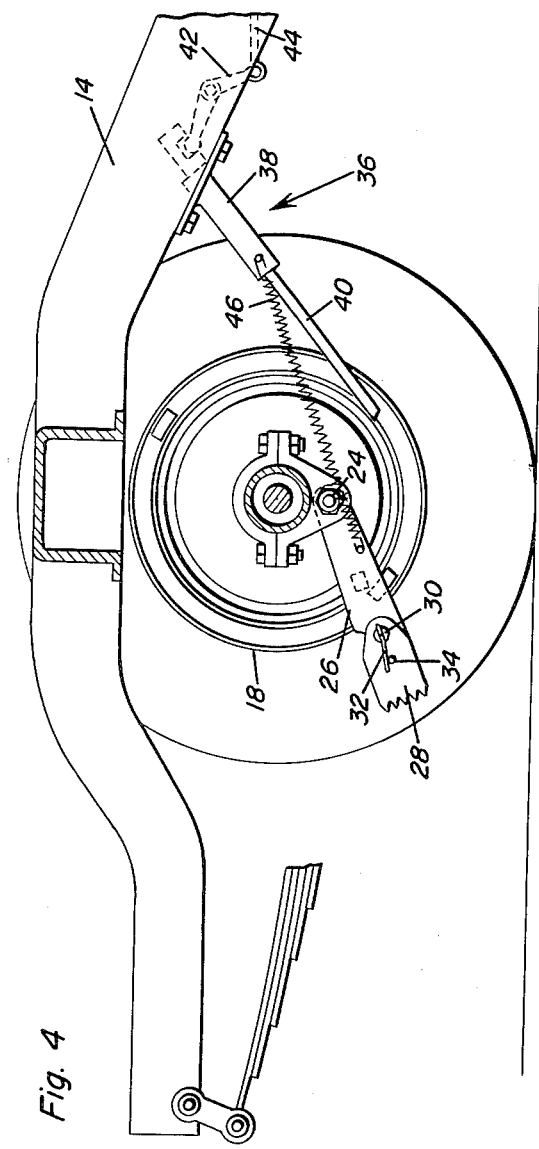
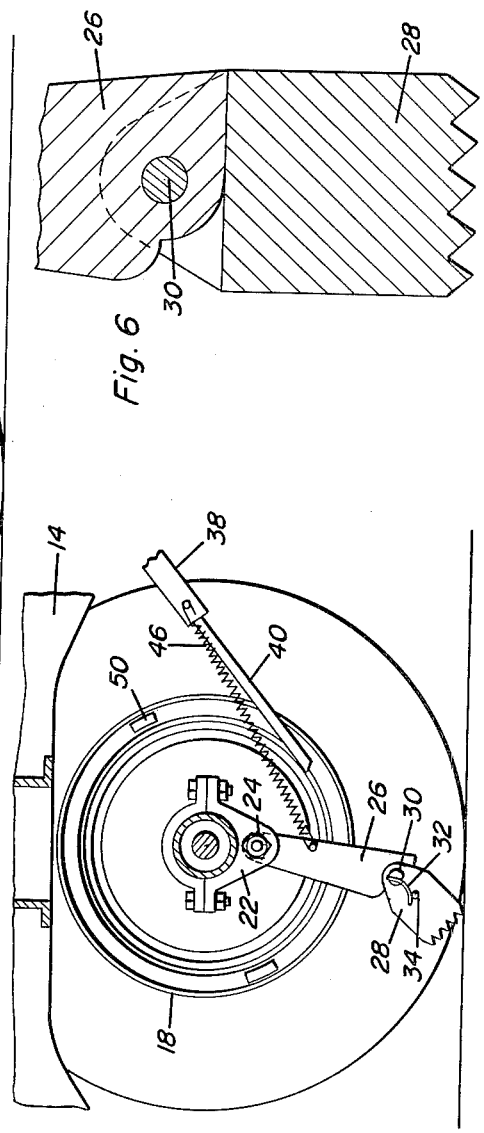
Ernest C. Truitt
INVENTOR.

United States Patent Office 3,036,649
Patented May 29, 1962

3,036,649
TRACTION DEVICE
Ernest C. Truitt, Phoenix, Md.
Filed Apr. 22, 1960, Ser. No. 24,134
9 Claims. (Cl. 180—7)

This invention relates to antiskid devices which may be mounted on a vehicle wheel for emergency use on slippery roadways.

It is therefore a primary object of this invention, to provide a device that may be readily applied to any vehicle wheel and subject to control by the vehicle driver for rendering it effective to apply additional traction for the vehicle when the wheel is slipping.

It is a further object of this invention in accordance with the foregoing object, to provide a traction device on a vehicle wheel which is of simple construction and easy to install yet rugged and effective.

In accordance with the foregoing objects, the traction device may be mounted on the inside of a vehicle wheel requiring little modification of the vehicle or wheel structure and comprises a pivotally mounted ground engaging member which is spring biased into a position of disuse and engageable by a driver control slide member for movement into an operative position, wherein a plurality of lugs mounted on the wheel rim may engage the pivotally mounted traction device to force it into ground engagement to thereby provide traction to the wheels through the lugs. As the lugs move past the pivotally mounted traction device, the traction device is released for spring biased movement back to its initial position wherein it may be re-engaged by one of the lugs whereby the traction device successively applies traction to the wheel through the lugs as they engage it.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of the traction device in accordance with this invention shown mounted on the inside of a vehicle wheel, the device being shown in inoperative position.

FIGURE 2 is a partial view similar to FIGURE 1 showing the traction device in ground engaging position after being moved to operative position.

FIGURE 3 is a front elevational view of the device in accordance with this invention.

FIGURE 4 is a view similar to FIGURE 1 showing the traction device in a position following a ground engaging position.

FIGURE 5 is a partial view of the traction device as it is being automatically returned to initial position.

FIGURE 6 is a sectional view taken through a plane indicated by section line 6—6 in FIGURE 3 and illustrating the ground engaging member of the traction device.

Referring to FIGURES 1 and 3, the traction device generally indicated by reference numeral 10 is shown mounted on the inside of a vehicle wheel 12 which in turn is mounted on a vehicle frame generally indicated by reference numeral 14, said wheel 12 including a pneumatic tire 16 and a wheel rim 18. The wheel is rotatably mounted by means including a tubular axle housing 20 in a conventional manner. Secured to the housing axle 20 is a bracket member 22 to which the traction device is pivotally connected by means of pivotal connection 24.

The traction device 10 includes an arm 26 connected to the bracket 22 by pivotal connection 24 and a ground engaging member or pawl 28 pivotally connected to the arm 26 by means of a pin 30. The ground engaging member 28 can rotate relative to the arm 26 on pin 30 in one direction only as more clearly seen in FIGURE 6. The ground engaging member 28 is however held in the position as shown in FIGURE 6 by means of a leaf spring 32 fixed to the pin 30 and in biasing contact with a pin 34 secured to the ground engaging member 28.

A driver operated control mechanism generally indicated by reference numeral 36, is mounted on the vehicle frame and includes a tubular guide or slide bracket 38 shown bolted to the frame 14 within which a slide member or bar 40 is mounted for engagement with the arm 26. The slide 40 may be actuated by a lever 42 link connected for operation by the vehicle driver, as by link member 44 as seen in FIGURES 1 and 4. A spring 46 connected to the arm 26 and the guide member 38 yieldably biases the arm 26 and traction device to an inoperative position as shown in FIGURE 1.

Referring to FIGURES 1 and 3 once again, an abutment or protuberance 48 is shown connected to the arm 26 projecting axially toward the wheel. Also secured to the rim 18 of the wheel are a number of projecting lugs or members 50, there being any number of lugs used, two being illustrated in the drawing. It is therefore apparent that the arm 26 may be pivoted downwardly from the position shown in FIGURE 1 wherein the abutment 48 thereon will come into the orbit or path of movement of the lugs 50 which will thereby engage the abutment 48 and move the arm 26 with its ground engaging member 28 into ground engaging position. In FIGURE 1, the spring 46 yieldably holds the arm 26 in its inoperative position with the abutment 48 thereon out of the path of movement of the lugs 50 on the wheel rim 18. When the driver actuated slide member 40 is moved into contact with the arm 26 it will pivotally move the arm 26 so that the abutment 48 thereon comes into the path of the lugs 50 whereupon a lug 50 will engage the arm 26 and bring the ground engaging member 28 into engagement with the ground as illustrated in FIGURE 2. Traction is thereby momentarily provided between the ground and the wheel 12 through the ground engaging member 28, the arm 26, its abutment 48 and lug 50 on the wheel rim. After the lug 50 has rotated past the position shown in FIGURE 2, it will release the abutment 48 as illustrated in FIGURE 4. The spring 46 will then be effective to return the arm and ground engaging member toward its initial position. As the arm 26 is being returned to its initial position, the pivotal connection between the arm 26 and the ground engaging member 28 will yield as illustrated in FIGURE 5 so as to permit return of the device to initial position wherein it may be engaged by one of the lugs 50 for again applying traction, the initial position of the arm 26 being determined then by the slide member 40.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A traction device for a vehicle wheel having a supporting axle member and wheel rim comprising, a mounting bracket secured to said axle member, an arm pivotally connected to said bracket at a point offset from said wheel axis, a ground engaging member pivotally connected to said arm for pivotal movement relative to said arm in one direction against a spring bias, a plurality of lugs secured to said wheel rim and projecting axially away from said wheel, an abutment fixed to said arm and projecting toward said wheel, a spring mounted on said vehicle and connected to said arm holding said arm in a position wherein the abutment thereon is not in the path of said lugs, a selectively operable slide member mounted on said vehicle and engageable with said arm to move said abutment into the path of said lugs.

2. Traction means for a vehicle wheel rotatable about a horizontal axis, said means including a member mounted on the wheel for rotation therewith in an orbit about the axis thereof, a one-way ground engaging traction device pivotally mounted on the vehicle adjacent the wheel, and means on said traction device movable therewith so as to swing into and out of the orbit of said member for engagement thereby for periodically operatively connecting the wheel to said device for actuating same intermittently and in one direction in unison with the wheel.

3. Traction means for a vehicle wheel rotatable about a horizontal axis, said means including a member mounted on the wheel for rotation therewith in an orbit about the axis thereof, a one-way ground engaging traction device pivotally mounted on the vehicle adjacent the wheel, and means on said traction device movable therewith so as to swing into and out of the orbit of said member for engagement thereby for periodically operatively connecting the wheel to said device for actuating same intermittently in one direction in unison with the wheel, said ground engaging traction device including an arm pivotally mounted on the vehicle and swingable about an axis parallel to but offset from the wheel axis.

4. Traction means for a vehicle wheel rotatable about a horizontal axis, said means including a member mounted on the wheel for rotation therewith in an orbit about the axis thereof, a one-way ground engaging traction device pivotally mounted on the vehicle adjacent the wheel, and means on said traction device movable therewith so as to swing into and out of the orbit of said member for engagement thereby for periodically operatively connecting the wheel to said device for actuating same intermittently in one direction in unison with the wheel, said ground engaging traction device including an arm pivotally mounted on the vehicle and swingable about an axis parallel to but offset from the wheel axis, said member including a lug fixed on the wheel, said device further including a protuberance on the arm engageable by said lug.

5. For use on a vehicle including a tubular housing, an axle journaled therein and a wheel fixed on said axle and rotatable about a horizontal axis, a traction device comprising a lug mounted on the wheel for rotation therewith in an orbit about the axis thereof, a ground engaging arm pivotally mounted for oscillation on the housing, and an abutment on the arm swingable into and out of the orbit of the lug for periodically operatively connecting the wheel to the arm for actuating same intermittently and in one direction in unison with said wheel.

6. A traction device in accordance with claim 5, said arm including a pawl on its free end portion engageable with the ground for operatively connecting the arm thereto in response to swinging movement of said arm in said one direction.

7. A traction device in accordance with claim 5, together with means for actuating the arm in the opposite direction when the lug is disengaged from the abutment.

8. A traction device in accordance with claim 5, together with means for manually actuating the arm in said one direction for positioning the abutment in the orbit of the lug.

9. A traction device in accordance with claim 8, said means including a tubular guide mounted on the vehicle, and a bar slidably mounted in the guide and engageable with the arm.

References Cited in the file of this patent

UNITED STATES PATENTS

| | | |
|---|---|---|
| 385,631 | Kahn | July 3, 1888 |
| 1,263,726 | Altgelt | Apr. 23, 1918 |
| 2,229,830 | White | Jan. 28, 1941 |
| 2,273,663 | Robert | Feb. 17, 1942 |